Figure 1:
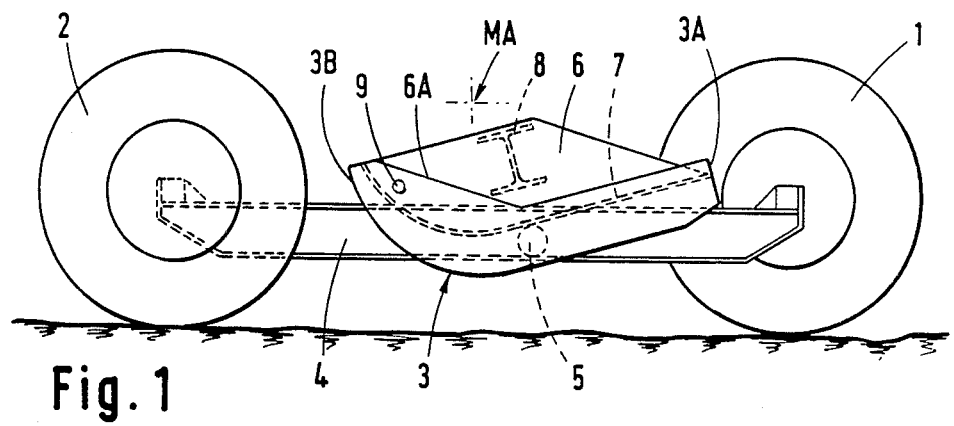

United States Patent [19]

Martinsen

[11] Patent Number: 4,826,385
[45] Date of Patent: May 2, 1989

[54] TRAILER

[75] Inventor: Egil Martinsen, Lillestrøm, Norway

[73] Assignee: Kr. Larsen Sveiseverksted A/S, Lillestrøm, Norway

[21] Appl. No.: 113,020

[22] Filed: Oct. 27, 1987

[51] Int. Cl.[4] .......................... B60P 3/06; B60P 3/12
[52] U.S. Cl. .................................. 414/373; 414/563; 414/484; 414/537; 280/402
[58] Field of Search ............... 414/537, 469, 482, 483, 414/484, 485, 563, 373; 280/402

[56] References Cited

U.S. PATENT DOCUMENTS

| | | | |
|---|---|---|---|
| 2,541,582 | 2/1951 | Hawkins | 414/563 |
| 2,607,607 | 8/1952 | Day | 414/537 X |
| 2,735,253 | 2/1956 | Huddle | 280/402 X |
| 3,312,362 | 4/1967 | Gilmore et al. | 414/430 |
| 3,338,440 | 8/1967 | Donahue | 414/482 |
| 3,584,754 | 6/1971 | Moll . | |
| 3,613,921 | 10/1971 | Ryden et al. | 414/537 |
| 4,081,090 | 3/1978 | Hopkins | 280/402 X |

FOREIGN PATENT DOCUMENTS 133183 12/1975 Norway .
2043556 10/1980 United Kingdom .

Primary Examiner—Frank E. Werner
Assistant Examiner—Gary Cundiff
Attorney, Agent, or Firm—Fleit, Jacobson, Cohn & Price

[57] ABSTRACT

Trailer unit for transporting constructional machines and the like, in particular tracked excavators, by means of a conventional truck or similar towing vehicle. The weight of the machine during transporting is resting in part on the towing vehicle and in part on the trailer unit (1, 2, 3, 4). The unit can be assembled on the basis of a bogie having at least two wheel and axle sets on an undercarriage (4). At either side thereof there is provided a supporting cradle (3) for carrying a portion of the tracks or wheels of the machine, said cradles being tiltable about a transverse, horizontal axis (5) between a lowered loading position and an elevated transporting position. The horizontal tilting axis (5) is located somewhat forwardly of the rear end of each cradle (3) at an area between the two ends (3A, 3B) thereof. The trailer unit makes possible a safe and comfortable loading and transportation of constructional machines and the like along the roads, by simple means which do not require large investments in transportation equipment.

9 Claims, 2 Drawing Sheets

TRAILER

There is previously known a relatively simple and inexpensive transporting unit or trailer for constructional machines and the like, in particular for tracked excavators, being based on the employment of a common towing vehicle, for example a truck, whereby the weight of the machine during transportation with this type of trailer unit, is resting in part on the towing vehicle where as the remaining part of the machine weight is supported by the transporting trailer unit. This unit can comprise at least two wheel and axle sets mounted at a spacing in the longitudinal direction of an undercarriage, and at either side thereof a supporting cradle for a portion of the tracks or wheels of the machine. These cradles are tiltable about a transverse, horizontal axis between a lowered loading position and a raised transporting position.

This type of trailer is primarily designed so that the machines concerned shall be loaded or driven onto the unit on their own, possibly by using the excavator scoop and the boom when excavators are concerned. Moreover, it is a necessary prerequisite that the machine type concerned has a loading mechanism, excavator boom or the like, which extends somewhat at one end of the machine and can be engaged against a loading area or the like on the towing vehicle, so as to be partially supported and especially hauled thereby during the transport. The load distribution between the towing vehicle and the actual trailer unit will among other things depend upon the position of the centre of gravity and the leverage between the point of engagement on the towing vehicle and the support on the trailer unit.

This type of transportation is particularly intended for excavators having a boom or cantilever arm designed for vertical movements with respect to the undercarriage of the machine, whereby an excavator scoop at the outer end of the boom is adapted to be engaged against and anchored to the towing vehicle, for example on a loading area thereof.

A problem in connection with such trailer units is the shifting of the cradles from loading position to transporting position. Previously known designs have necessitated an anchoring by means of a chain or steel wire length or the like, between the forward end of the cradles and the machine undercarriage, possibly the tracks, in order to make possible the raising to transport position. This can lead to very large and undesired stresses on the structures. Moreover, not all the machine types which it is of interest to transport, have had a sufficient force in their excavator boom, loading mechanism or the like, to provide for the necessary raising movement for shifting the cradles of the trailer from loading position to transporting position.

This invention presents a solution to these problems, including in the first place the novel and specific feature that said horizontal tilting axis is located somewhat forwardly of the rear end of each cradle in the area between the two ends thereof. A particularly preferred location of this horizontal tilting axis is such that this at least in the transporting position of the cradles lies forwardly of the axis for the rear wheels, possibly the supporting or driving wheels for tracks on the machine.

With such an arrangement there will be obtained a very favourable leverage during shifting or tilting from loading position to transporting position, as well as a more secure support of the machine during transport.

Another substantial advantage of this solution consists therein that the above mentioned anchoring with chains or steel wire is no longer necessary, since the cradles in the present trailer unit by themselves will be maintained in a correct position with full engagement against the wheels of the machine, possibly against the excavators tracks along the whole inner supporting surface of each cradle.

Figure 2:
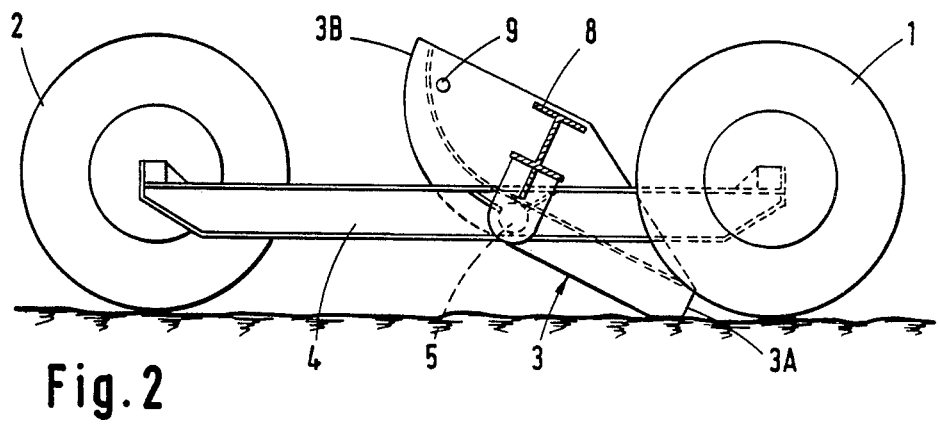
Figure 3:
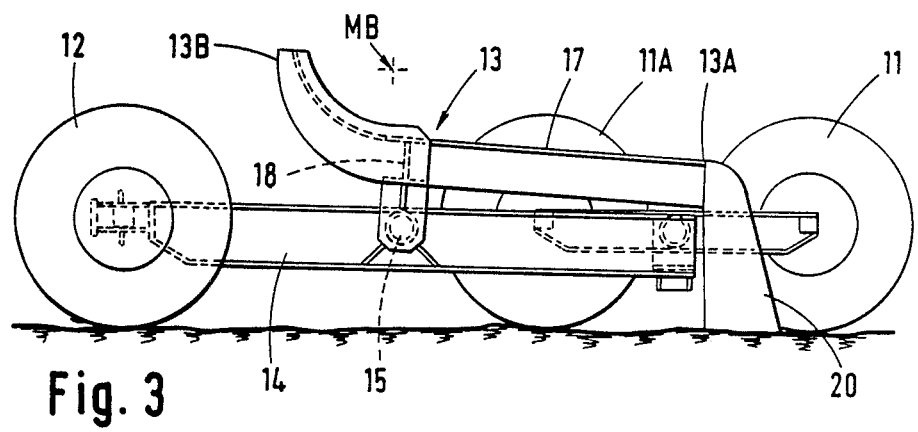
Figure 4:
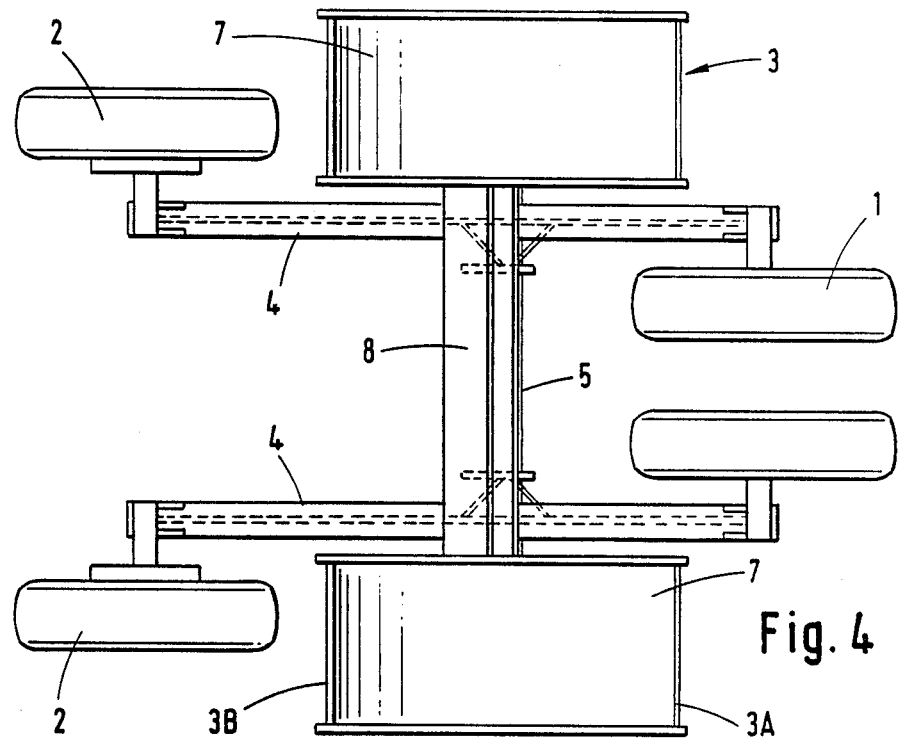
Figure 5:
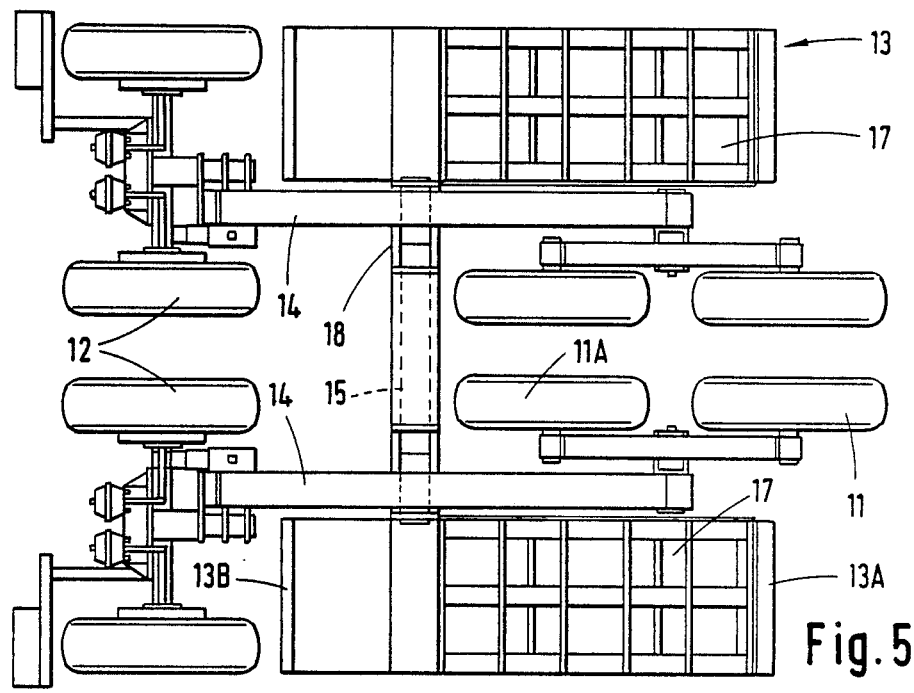

The invention shall be explained more closely in the following with reference to the drawings, in which:

FIG. 1 is a side elevation view of a first embodiment of the transporting or trailer unit of the invention in transport position, FIG. 2 is a central vertical longitudinal section of the embodiment of FIG. 1 in loading position, and FIG. 3 is a side elevation view of a somewhat modified embodiment in loading position, FIG. 4 is a top plan view of the embodiment of FIG. 1, and FIG. 5 is a top plan view of the embodiment of FIG. 3.

The unit in FIG. 1 comprises a front wheel and axle set 1 and a rear wheel and axle set 2 with an intermediate undercarriage 4 which can mainly consist of beams between the wheel bosses on either side, and these beams can be adapted to be tilted about a horizontal axis independently of each other. Moreover, the wheel and axle sets can possibly consist of several wheels mounted side by side in order to increase the loading capacity. The unit can be considered to constitute a bogie in cooperation with a towing vehicle for example a truck (not shown).

A cradle 3 for supporting a machine wheel or track portion (for example a rear wheel or a track portion) is carried by the undercarriage 4 by means of a horizontal transverse axle 5 which can be the same as makes possible the mutual tilting movements of the longitudinal beams of the undercarriage 4. With reference to the intended normal direction of travel during transport, the cradle 3 has a forward end 3A and a rear end 3B. Between these there is provided an engagement or supporting surface 7 on which the machine wheel or track is resting during transport. From the forward end 3A and backwards on the cradle 3 the supporting surface 7 extends generally in a plane, but is then formed with a curvature upwards towards the rear end 3B. The radius of curvature of this shape is suitably adjusted according to the wheel dimensions or the curvature of the track portion of the machine concerned. At MA there is indicated a center of curvature or an axis for such wheels or track portions on the machine type or types concerned.

With the illustrated design of the cradle 3 and the location of the horizontal tilting axle 3, there is obtained a very advantageous transporting position as shown in the FIG. 1, whereby the forward part of the supporting surface 7 is pointing at an inclination forwardly and up to the forward end 3A of the cradle, the axis or centre of curvature MA of the machine wheels or track portions being supported in the cradle 3, lying rearwardly of the axle 5 in the transport position shown. As to the relationship between the individual components included in the structure, it is also of significance that the tilting axle 5 is located underneath the load or support surface 7 for carrying the machine. Among other things this involves an advantage with respect to mechanical strength. Further, a significant contribution to the structural strength of the cradle 3 is made by a strong side wall 6 provided on the inside against the undercarriage 4 the strong side wall 6 runs from the rear end 3B of the cradle forwardly, generally in parallel to the flat portion of the supporting surface 7 approximately to the middle of the cradle and then slopes downwardly and forwardly to the forward end 3A. Between the middle portions of these side walls 6 of the pair of cradles on either side of the unit, there is mounted a transverse beam 8 which constitutes the main transverse connection between the two sides of the whole trailer unit. As shown this transverse beam 8 lies on top of the undercarriage 4 and participates in the tilting movement of the cradles between the transport position in FIG. 1 and the loading position shown in FIG. 2.

On the outer side of each cradle 3 there is provided a generally lower side wall 6A the upper edge of which runs somewhat higher than the supporting surface 7 between the ends of the cradle 3. Between these two walls 6 and 6A and inserted through openings therein, there is shown a bolt 9 which serves to secure the machine in the cradle, as the bolts 9 can be inserted through passages or spaces in the machine wheel or track mechanism. Such a security bolt is not strictly necessary, but in many cases it will be preferred so as to obtain complete safety against undesired movements of the machine in the cradle during transport.

In the loading position as shown in FIG. 2, the cradle 3 has been tilted forwardly about the axle 5 so that the forward end 3A engages the ground and loading of the machine then takes place onto the supporting surface 7 at this forward end, whereby the machine can easily on its own provide for this loading. When the machine has driven with its wheels or track end portions completely into the cradle 3, the shifting or tilting thereof from loading position in FIG. 2 to transport position in FIG. 1, is provided for by the loading mechanism or excavator boom of the machine itself, as explained in the introductory portion of this description. As a consequence of the location of the tilting axle 5 in relation to the whole length of the cradle 3, this shifting or raising movement can take place without problems.

Preferably, as shown in FIG. 4, the width of the front wheel and axle set 1 of the embodiment of FIG. 1 is smaller than the transverse distance between the cradles 3 thereof.

The modified embodiment as shown in FIG. 3, in addition to a rear wheel and axle set 12 has a front wheel and axle set 11 and 11A which in itself can form a bogie. With several wheels arranged in this manner, the loading capacity of course can be increased. A more specific feature of the unit in FIG. 3 however, is the fact that the cradle 13 shown therein, at its forward end 13A has a supporting leg 20 extending downwards and involving a certain step up for the machine when in the illustrated loading position of the unit in FIG. 3, it shall move onto the supporting surface 17 of the cradle. As the supporting surface 17 also the steeply rising leg 20 can be provided with transverse ribs or the like so as to enable the machine to have a better grip against these surfaces during loading.

This design with a step up at the forward end of the cradle serves to give a necessary elevation of the whole machine when this has so small ground clearance that it might contact the wheels of the trailer unit, in case of a design as shown in FIGS. 1 and 2, where the forward end 3A of the cradle is intended to be engaged directly against the ground or load surface during loading.

In FIG. 3 there is also shown an undercarriage 14 between the different wheel and axle sets, and besides there is shown a horizontal tilting axle 15 which in this embodiment is rather closer to the rear end 13B of the cradle 13 than to the forward end 13A thereof. Irrespective of these dimensional relationships, the same advantages with respect to balance and safety during loading and in the transporting position, will exist in the embodiment of FIG. 3 as in the one of FIG. 1 and 2. Thus in FIG. 3 there is also indicated a center or an axis MB for the rear wheels or track portion of the machine, being located above or perhaps somewhat rearwardly of the axle 15 in the loading position shown. When the cradle 13 is tilted backwards to the transport position, the axis MB will also be moved further backwards and thereby result in the favourable transporting position as explained above.

In the embodiment of FIG. 3 the supporting surface 17 is also shown with a curvature upwardly and rearwards to the rear end 13B of the cradle, in similarity to the design in FIG. 1 and 2. This curvature contributes to the determination of the location of the axis MB depending upon the wheel dimensions or track curvature of the machine type concerned. Obviously, the curved supporting surface 17 extending rearwardly and upwards does not have to extend continuously in this manner, as a corresponding effect will be obtained with a rear limitation or support in the form of a smaller stop or engagement surface at the uppermost and rearmost of the cradle end 13B. It is preferred however, that the cradle has a substantially continuous supporting surface 17 along its whole length, since the support and the pressure distribution during transport will then be better.

As the embodiment of FIG. 1 and 2, the one as FIGS. 3 also has a strong transverse beam 18 between cradles 13 on either side of the trailer unit. Advantageously the transverse beam 18 is located in the region above the horizontal transverse axle 15. Since the beam 18 lies at a lower level than the surface 17 it can be extended completely underneath the actual cradle at both sides, so that an additional advantage with respect to structural strength is obtained. It is not then necessary to have a high inside wall as described in connection with FIG. 1 and 2.

Preferably, as shown in FIG. 5, the width of the front wheel and axle set 11 of the embodiment of FIG. 3 is smaller than the transverse distance between the cradles 13 thereof.

I claim:

1. A trailer unit for use with a towing vehicle for transporting tracked constructional machines and the like, such as excavators, said trailer unit comprising:
   an elongated undercarriage;
   a front wheel and axle set and a rear wheel and axle set provided on said undercarriage, said front and rear wheel and axle sets being spaced apart in the longitudinal direction of said undercarriage; and
   two supporting cradles elongated in the longitudinal direction of the undercarriage and located on opposite transverse sides of said undercarriage, said cradles being spaced apart at a transverse distance greater than the width of said front wheel and axle set and said cradles being tiltable about a transverse, horizontal axis relative to said undercarriage between a lowered loading position and a raised transporting position, said transverse horizontal axis being located intermediate the front end and the rear end of each cradle;

wherein, during transport of a tracked constructional machine, a portion of the weight of the machine rests on the towing vehicle and the remaining portion of the weight of the machine is supported by said trailer unit, said towing vehicle and said trailer unit being coupled by the machine being transported; and wherein, during transport of the tracked constructional machine, portions of the tracks of the machine are received in said supporting cradles of the trailer unit such that the transverse horizontal tilting axis of the cradles is nearer the forward end of said trailer unit than is a track support axis of the tracks of the machine being transported.

2. A trailer unit according to claim 1, wherein each of said cradles has a longitudinally extending supporting surface and wherein the horizontal tilting axis is located below the supporting surfaces of the cradles.

3. A trailer unit according to claim 1, wherein each of said cradles has a longitudinally extending supporting surface having a rear portion and a front portion, the front portion of the supporting surface of each cradle being substantially planar and the rear portion of the supporting surface of each cradle being curved upwardly with respect to the front portion of the supporting surface.

4. A trailer unit according to claim 3, wherein the curvature of the curved rear portion of the supporting surface of each cradle corresponds to the radius of curvature of rear track portions of the machine being transported.

5. A trailer unit according to claim 3, wherein each cradle has an upstanding side wall extending along the inner edge of at least the front portion of the supporting surfaces thereof.

6. A trailer unit according to claim 1, further comprising a strong transverse beam extending between said two cradles.

7. A trailer unit according to claim 6, wherein each of said cradles comprises a supporting surface and wherein the transverse beam extends between the outermost lateral edges of the cradles below the supporting surface of each cradle.

8. A trailer unit according to claim 1, wherein the front end of each cradle engages the ground or road surface when the trailer unit is in the loading position.

9. A trailer unit according to claim 1, wherein each of said cradles is provided with transverse locking bolt receiving means to thereby secure the machine being transported against undesired movement in the cradles during transport thereof.

* * * * *